United States Patent [19]

Furtek et al.

[11] Patent Number: 5,461,017
[45] Date of Patent: Oct. 24, 1995

[54] OLEFIN POLYMERIZATION CATALYSTS

[75] Inventors: Allan B. Furtek, Warren; Ronald S. Shinomoto, Edison, both of N.J.

[73] Assignee: Mobil Oil Corporation, Fairfax, Va.

[21] Appl. No.: 205,430

[22] Filed: Mar. 4, 1994

Related U.S. Application Data

[63] Continuation-in-part of Ser. No. 991,486, Dec. 15, 1992, Pat. No. 5,362,824, which is a continuation of Ser. No. 808,257, Dec. 13, 1991, abandoned.

[51] Int. Cl.$^6$ .............................. B01J 31/12; B01J 31/06
[52] U.S. Cl. ........................ 502/109; 502/116; 502/117; 502/124; 502/125
[58] Field of Search ................................. 502/109, 116, 502/118, 117, 124, 125

[56] References Cited

U.S. PATENT DOCUMENTS

| | | | |
|---|---|---|---|
| 3,787,384 | 1/1974 | Stevens et al. | 260/94.9 |
| 4,076,698 | 2/1978 | Anderson et al. | 526/348.6 |
| 4,137,547 | 1/1979 | Yamamitsu et al. | 358/8 |
| 4,148,754 | 4/1979 | Strobel et al. | 252/429 C |
| 4,302,566 | 11/1981 | Karol et al. | 526/125 |
| 4,670,413 | 6/1987 | Furtek | 502/120 |
| 4,769,429 | 9/1988 | Furtek | 526/129 |
| 4,808,561 | 2/1989 | Welborn, Jr. | 502/104 |
| 4,871,705 | 10/1989 | Hoel | 502/117 |
| 4,876,229 | 10/1989 | Furtek | 502/107 |
| 4,900,706 | 2/1990 | Sasaki et al. | 502/116 |
| 4,921,825 | 5/1990 | Kioka et al. | 502/104 |
| 4,983,694 | 1/1991 | Furtek | 526/125 |
| 5,077,255 | 12/1991 | Welborn, Jr. | 502/104 |
| 5,118,648 | 6/1992 | Furtek et al. | 502/116 |
| 5,362,824 | 11/1994 | Furtek et al. | 526/114 |

FOREIGN PATENT DOCUMENTS

| | | |
|---|---|---|
| 0313386 | 10/1986 | European Pat. Off. . |
| 0283011 | 3/1988 | European Pat. Off. . |
| 0294942 | 5/1988 | European Pat. Off. . |

OTHER PUBLICATIONS

Sederal, W. L., et al., "Styrene–Divinylbenzene Copolymers. Construction of Porosity in Styrene Divinylbenzene Matrices", Journal of Applied Polymer Science, vol. 17., pp. 2835–2846, (1973).

Kun, Kenneth A., "Macroteticular Resins. III. Formation of Macroreticular Styrene Divinylbenzene Copolymers", Journal of Applied Polymer Science, vol. 6., pp. 2689–2701, (1968).

*Primary Examiner*—Asok Pal
*Assistant Examiner*—Bekir L. Yildirim
*Attorney, Agent, or Firm*—Alexander J. McKillop; Malcolm D. Keen; Marina V. Schneller

[57] ABSTRACT

An improved catalyst for the polymerization of olefins comprising at least one metallocene and at least one aluminoxane co-catalyst supported on a substrate comprising a cross-linked polymeric, porous, resin wherein at least one of the monomers in the resin has at least one pendant functional group which is not reactive under the conditions of the formation of the substrate, and therefore survives the copolymerization which forms the substrate. One specific cross-linked resin is a copolymer of styrene, divinyl benzene and acetoxy styrene.

7 Claims, No Drawings

OLEFIN POLYMERIZATION CATALYSTS

CROSS REFERENCE TO RELATED APPLICATIONS

This is a continuation-in-part of Ser. No. 07/991,486, filed Dec. 15, 1992, now U.S. Pat. No. 5,362,824 which in turn is a Rule 62 continuation application of Ser. No. 07/808,257, filed Dec. 13, 1991 (now abandoned), each of which is relied upon under 35 USC 120, and incorporated by reference herein.

This invention is related to the polymerization of olefins, particularly the copolymerization of ethylene with a higher α-olefin to produce a material referred to as linear low density polyethylene (LLDPE). It more particularly refers to a novel catalyst composition which is especially well suited to use for catalyzing this copolymerization, which catalyst is based on at least one Group 4 (IUPAC) transition metal, specifically zirconium and/or hafnium, in combination with an aluminoxane.

BACKGROUND OF THE INVENTION

The polymerization of olefins, particularly ethylene, is well known and has been a widely practiced commercial art for many decades. Catalysts for such polymerization are well known to include Ziegler type catalysts. In the Ziegler type catalyst field, the catalyst is usually made up of a transition metal compound and an alkyl aluminum, which is used as a co-catalyst, sometimes with a magnesium compound as well, usually on a suitable support.

In more recent times, it has been discovered that the copolymerization of ethylene and higher olefins, that is the production of LLDPE, can be catalyzed by special zirconium and/or hafnium compounds. These compounds, called metallocenes, have been proposed for use in this service in combination with aluminoxanes, as co-catalysts, both deposited on a silica substrate.

SUMMARY OF THE INVENTION

It has now been found that it is not always desirable that there be absolutely no surface functionality on the cross-linked resinous substrate particles of an olefin polymerization catalyst comprising a at least one metallocene and at least one aluminoxane. It has been discovered that some surface functionality on the cross-linked resinous substrate is desirable, but that this surface functionality must be closely controllable to the purpose intended.

In accordance with an object of this invention, an olefin polymerization catalyst system, comprising a porous, resinous cross-linked substrate and a metallocene/aluminoxane catalyst/co-catalyst system on the surface thereof, is modified to provide a controlled amount of functionality on the surface of the substrate.

According to the invention, a polymerization catalyst substrate is provided which is a novel cross-linked resinous particle(s) of controlled pore size and particle size having a controlled amount and kind of surface, including the surface area of the substrate that is inside the pore system thereof, functionality.

Other and additional aspects of this invention will become apparent from a consideration of this entire specification, including the claims appended hereto.

One aspect of this invention comprises porous, cross-linked resin particles containing pendant functional groups chemically bonded into the polymer system, at least at the surface of the particles.

DETAILED DESCRIPTION

The support has functional sites that chemically interact with the metallocene/aluminoxane deposited thereon to prepare low molecular polymers in a controlled fashion by varying the type and amount of functionality.

Catalysts prepared on these porous supports do not require the use of external methylaluminoxane cocatalyst solutions. As such, they are ideally suited for gas phase polymerization reactors and do not require high aluminoxane/metallocene ratios.

According to this invention, additional monomers, containing reactive groups which are not substantially reactive with the strictly hydrocarbon basic monomers, are included in the monomer mixture which is co-polymerized to produce the desired substrate particle, and are copolymerized along with the basic monomers to form the catalyst substrate particles. It has now been found that these pendant additional monomers remain as unreacted functional groups after the formation of the cross-linked resinous particles. Thus, they are quite desirably co-polymerized directly into the cross-linked co-polymer in a manner such that their "non-reactive" functional groups remain active on the surface of the resultant resinous substrate particles. In this condition, they are readily available for further reaction after the crosslinked resinous catalyst substrate particle has been formed.

According to this aspect of this invention, monomers such as acrylic and methacrylic acids and esters, vinyl ethers, such as methyl vinyl ether, vinyl esters, such as vinyl acetate, vinyl halides, such as vinyl chloride, acrylonitriles, alkylene glycol di-acrylates and methacrylates, such as ethylene and propylene glycol di-acrylates and methacrylates, hydroxy terminated unsaturated acids and esters, such as ω hydroxy acrylic acid and esters thereof, halo substituted aromatic olefins, such as chloro-styrene or chloro-divinyl benzene, hydroxy substituted styrene or divinyl benzene, vinyl toluene, vinyl pyridine, vinyl benzyl halides, such as vinyl, benzyl chloride, and the like, are quite useful. It is within the scope of this invention to use between about 1 and 30 weight percent of one or more added monomers containing at least one pendant functional group in admixture with the basic monomer(s). In one aspect of this invention, where the basic monomers are styrene and divinyl benzene, this proportion of added monomer is copolymerized with a mixture comprising up to about 94% styrene and the remainder, that is at least about 6%, divinyl benzene. Similar proportions of the functional monomer are suitably used with other basic monomers.

The functional co-monomers used in this invention should preferably, but do not necessarily have to, have the same fundamental structure and chemistry as the co-monomers which are being co-polymerized to form the basic porous particle of this invention. Thus, in the situation where aromatic monomers, like styrene and divinyl benzene, are the basic polymerization building blocks, the added functional co-monomer should also preferably have a styrene, or at least an aromatic type, core structure.

Moreover, it is important to the practice of this invention that the functional group of the added monomer, to which this aspect of this invention is directed, should be a group which is substantially inert during the polymerization of the basic monomers. Thus, if the cross-linked polymer which will form the fundamental particle substrate for use in this invention is an olefin addition polymer, the added functional group should be one which does not readily react with olefinic unsaturation under the polymerization conditions. On the other hand, if the fundamental polymer of the particulate substrate is a condensation polymer, such as a polyester or a polyamide, the additional functional group may be an olefinic unsaturation, provided that it does not react to any appreciable extent in the polymerization condensation reaction. In all of these subgenera, the polymerization conditions should be taken into account when selecting the monomers being reacted so as to insure that only those desired functional substituents react in the polymerization, only those desired portions of the polymer react in the cross-linking, and those desired functional groups which need to be retained do not react at all in the basic process of producing the crosslinked resinous porous particle. The porous nature of the resinous support is an important factor in producing metallocene/aluminoxane catalysts with desirable properties. Nonporous supports result in highly agglomerated catalyst particles that result in serious process problems in feeding the catalyst to the reactor.

The practice of this aspect of this invention has provided another degree of freedom in controlling the properties of the ethylene polymerization products produced using catalysts of the metallocene/aluminoxane/resinous substrate type. By the addition of a functional co-monomer in the production of the crosslinked resinous substrate, it has been possible to provide means to further be able to control the molecular weight of the polymer products. Indeed, where the pendant functional group is an acetoxy group; where the catalyst comprises a zirconocene, an aluminoxane, and an aluminum hydrocarbyl on a crosslinked, porous, resinous styrene-divinyl benzene substrate; where the catalyst has been made in substantially the same way and with the same proportions of constituents; and where the ethylene polymerization has been carried out under the substantially same conditions, the polymer product produced had a melt index about three (3) orders of magnitude higher than where the catalyst substrate did not have a functional monomer copolymerized thereinto.

These functionalized porous substrates may also be used as a support for metallocene/aluminoxane catalysts that do not require the presence of external methylaluminoxane co-catalyst. This imparts several advantages to this catalyst system. Nonrequisite use of methylaluminoxane cocatalyst makes these catalysts ideally suited for gas phase polymerizations. Methylaluminoxane cocatalyst solutions have resulted in serious process problems in fluid-bed (gas phase) reactors as disclosed in a copending patent application. Another advantage is more prudent use of expensive methylaluminoxane. Much lower methylaluminoxane to metallocene ratios are required for these catalyst systems.

According to this invention, it is preferred that the metallocene is cyclopentadienyl zirconium chloride in a preferred proportion of about 0.025 to 0.65 mmol/gram of support; that the aluminoxane is an alkyl aluminoxane in a preferred proportion of about 0.1 to 20 mmol Al/gram of support; and that the hydrocarbyl aluminum is an alkyl aluminum in a preferred proportion of about 0.1 to 6 mm Al/gram of support. The alkyl groups which are suited to use in the aluminoxane portion of this composition are suitably groups having about 1 to 6 carbon atoms per alkyl group, preferably about 1 to 3 carbon atoms per alkyl group, most preferably methyl. The hydrocarbyl group portion of the hydrocarbyl aluminum portion of the catalyst of this invention is suitably made up of at least one aliphatic group having up to about 8 carbon atoms, preferably up to about 6 carbon atoms, and most preferably a branched alkyl group such as isoprenyl or isobutyl.

In a preferred formulation, the divinyl benzene comprises about 30% by weight of the crosslinked resinous substrate, the styrene comprises about 55%, and functional added monomer is p-acetoxy styrene which comprises about 15% thereof. The aluminoxane is methyl aluminoxane, and the hydrocarbyl aluminum is isoprenyl aluminum.

To form catalysts of the invention, catalyst preparation is undertaken under anhydrous conditions and in the absence of oxygen. In a unique process, the carrier material is impregnated with aluminoxane, preferably methylaluminoxane, in a process described below, The class of aluminoxanes, comprises oligomeric linear and/or cyclic alkylaluminoxanes represented by the formula:

$R-(Al(R)-O)_n-AlR_2$ for oligomeric, linear aluminoxanes and $(-Al(R)-O-)_m$ for oligomeric cyclic aluminoxane wherein n is 1–40, preferably 10–20, m is 3–40, preferably 3–20 and R is a $C_1-C_8$ alkyl group and preferably methyl. MAO is a mixture of oligomers with a very wide distribution of molecular weights and usually with an average molecular weight of about 1200. MAO is typically kept in solution in toluene.

The metallocene compound has the formula $Cp_mMA_nB_p$ in which Cp is an unsubstituted or substituted cyclopentadienyl group, M is zirconium or hafnium and A and B belong to the group including a halogen atom, hydrogen or an alkyl group. In the above formula of the metallocene compound, the preferred transition metal atom M is zirconium. In the above formula of the metallocene compound, the Cp group is an unsubstituted, a mono- or a polysubstituted cyclopentadienyl group. The substituents on the cyclopentadienyl group can be preferably straight or branched chain $C_1-C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as $-CH_2-$, $-CH_2-CH_2-$, $-CR'R''-$ and $-CR'R''-CR'R''-$ where R' and R'' are short alkyl groups or hydrogen, $-Si(CH_3)_2-$, $Si(CH_3)_2-CH_2-CH_2-Si(CH_3)_2-$ and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1-C_8$ alkyl groups, such as methyl, ethyl, n-propyl, iso-propyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1-C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienylzirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride. The metallocene compounds utilized within the embodiment of this art can be used as crystalline solids, as solutions in aromatic hydrocarbons or in a supported form.

Solvent may be removed from the aluminoxane impregnated pores the carrier material by heating and/or under a vacuum or purged with heating in an inert gas, such as nitrogen.

SPECIFIC EXAMPLES OF THIS INVENTION

In the following examples, all parts and percentages are by weight unless specifically recited to be on some different basis. These examples are intended to be illustrative of this invention and in support of the patentability thereof, but are not to be taken as in any way limiting on the scope of this invention.

EXAMPLE 1

Five grams of a cross-linked polymer of 55% styrene, 30% divinyl benzene, and 15% p-acetoxy styrene, where the acetoxy groups of the terpolymer were hydrolyzed to hydroxy groups with hydrazine, were dried under vacuum at 110° C. for 12 hours. To the dried copolymer beads, 50 cc of toluene was added and the slurry mixture heated to 70° C. with stirring. Then 4.2 cc of a 25% solution of isoprenyl aluminum in hexane was added. After stirring for 10 minutes, 3.4 cc of a 12% solution (5.8 wt % Al) of methylaluminoxane in toluene was added. After stirring for 30 minutes, a solution of 0.10 g $Cp_2ZrCl_2$ dissolved in 10 cc toluene was added. The solvent was then removed by nitrogen purging at 80° C. for several hours until dry. The resulting catalyst was composed of 0.068 mmol of bis(cyclopentadienyl)zirconium dichloride/gram of support; 1.3 mmol, based on aluminum, of methylaluminoxane/gram of support; and 1.0 mmol, based on aluminum, of isoprenyl aluminum/gram of support.

Ethylene Polymerization

Polymerization was performed in a 4 liter slurry autoclave reactor equipped with propeller stirrer, external heating jacket for temperature control, a catalyst and co-catalyst inlet and a regulated supply of dry nitrogen, ethylene, and 1-hexene. The internal walls of the reactor were dried by baking at 85° C. for one hour under a slow nitrogen stream. After cooling to ambient temperature, 1.45 liters of dry hexane and 0.25 liter of 1-hexene were delivered to the reactor under a steady nitrogen stream. Then 2.0 cc of a 12% solution (5.8 wt % Al) of methylaluminoxane in toluene was injected into the reactor. The reactor was heated to 85° C. with stirring at 900 rpm, filled with ethylene until a total pressure of 150 psig was obtained, and then 0.15 g of the catalyst injected into the reactor using a hexane filled bomb containing 200 psig ethylene. The polymerization reaction was allowed to proceed for 60 minutes. A yield of 97 grams of copolymer product was obtained. The polymer had a melt index ($I_2$) of 430 g/10 min. The productivity of the catalyst was 490 g/g catalyst/hr/100 psi ethylene.

Comparative Example 1

A solid catalyst was prepared in the same way as in Example 1 except Davison 955 silica (calcined overnight at 600° C.) instead of the cross-linked polymer was used as the solid support. Polymerization was carried out as in Example 1. The co-polymer product had a melt index ($I_2$) of 34 g/10 min. The productivity of the catalyst was 500 g/g catalyst/hr/100 psi ethylene. The melt flow ratio ($MFR=I_{21}I_2$) of the co-polymer was 17.

Comparative Example 2

A solid catalyst was prepared in the same way as in Example 1 except the cross-linked polymer used as the solid support was composed of a copolymer of 80% styrene and 20% divinyl benzene. Polymerization was carried out as in Example 1. The co-polymer product had a melt index ($I_2$) of 1.9 g/10 min. The productivity of the catalyst was 810 g/g catalyst/hr/100 psi ethylene.

Comparative Example 3

A solid catalyst was prepared in the same way as in Example 1 except spherical non-porous (1% cross-linked) polystyrene (#200–#400, a product of Eastman Kodak Co.) was used as the solid support. The resulting catalyst was highly agglomerated and could not be fed into the reactor.

EXAMPLE 2

A solid catalyst was prepared in the same way as in Example 1 except the cross-linked polymer used as the solid support was composed of a terpolymer of 55% styrene, 30% divinyl benzene, and 15% p-acetoxy styrene. Polymerization was carried out as in Example 1. The co-polymer product had a melt index ($I_2$) of 1500 g/10 min. The productivity of the catalyst was 560 g/g catalyst/hr/100 psi ethylene.

EXAMPLE 3

One gram of a cross-linked polymer of 55% styrene, 30% divinyl benzene, and 15% p-acetoxy styrene, where the acetoxy groups of the terpolymer were hydrolyzed to hydroxy groups with hydrazine, were dried under vacuum at 110° C. for 12 hours. The dried copolymer was slurried in about 20 ml heptane and 1.4 ml of 15% trimethylaluminum in heptane was added. After stirring for one hour at 70° C., the solvent was removed by nitrogen purging at 70° C. for one hour. The trimethylaluminum-treated beads were reslurried in about 20 ml toluene, to which a solution of 0.030 gram of bis(n-butylcyclopentadienyl)zirconium dichloride in 3.2 ml of 13.7wt % Al methylaluminoxane in toluene was added with stirring at 70° C. for 30 minutes. Solvent was removed by nitrogen purging at 70° C. for 2 hours, after which free flowing beads were obtained. The resulting catalyst was composed of 0.075 mmol of bis(cyclopentadienyl)zirconium dichloride/gram of support; 15.0 mmol based on aluminum, of methylaluminoxane/gram of support; 1.9 mmol, based on aluminum, of trimethylaluminum/gram of support.

Ethylene Polymerization

Polymerization was performed in a 4 liter slurry autoclave reactor equipped with propeller stirrer, external heating jacket for temperature control, a catalyst and co-catalyst inlet and a regulated supply of dry nitrogen, ethylene, and 1-hexene. The internal walls of the reactor were dried by baking at 85° C. for one hour under a slow nitrogen stream.

After cooling to ambient temperature, 1.50 liters of dry hexane and 0.35 liter of 1-hexene were delivered to the reactor under a steady nitrogen stream. Then 1.7 cc of 15% solution of trimethyl aluminum in heptane was injected into the reactor. The reactor was heated to 80° C with stirring at 900 rpm, filled with ethylene until a total pressure of 180 psig was obtained, and then 0.12 g of the catalyst injected into the reactor using a hexane filled bomb containing 220 psig ethylene. The polymerization reaction was allowed to proceed for 60 minutes. A yield of 199 grams of co-polymer product was obtained. The polymer had a melt index ($I_2$) of 1.0 g/10 min. The productivity of the catalyst was 1000 g/g catalyst/hr/100 psi ethylene. The melt flow ratio (MFR=$I_{21}/I_2$) of the co-polymer product was 15.

Comparative Example 3

A solid catalyst was prepared in the same way as in Example 3 except PQ 988 silica (calcined for 12 hours at 600° C.) instead of the cross-linked polymer used as the solid support. Polymerization was carried out as in Example 3. The co-polymer product had a melt index ($I_2$) of 0.38 g/10 min. The productivity of the catalyst was 310 g/g catalyst/hr/100 psi ethylene. The melt flow ratio (MFR=$I_{21}/I_2$) of the co-polymer was 22.

Comparative Example 4

A solid catalyst was prepared in the same way as in Example 3 except a copolymer of 80% styrene and 20% divinyl benzene was used as the solid support. Polymerization was carried out as in Example 3. The co-polymer product had a melt index ($I_2$) of 0.52 g/10 min. The productivity of the catalyst was 920 g/g catalyst/hr/100 psi ethylene. The melt flow ratio (MFR=$I_2/I_2$) of the co-polymer was 17.

Comparative Example 5

A solid catalyst was prepared in the same way as in Example 3 except nonporous 1% cross-linked polystyrene (#200–#400, a product of Eastman Kodak Co. ) was used as the solid support. The resulting catalyst was highly agglomerated and could not be fed into the reactor.

What is claimed is:

1. A catalyst composition comprising
bis[cyclopentadienyl]zirconium dichloride contacted with a methylaluminoxane to form an activated composition effective to copolymerize ethylene with an alpha olefin of 3 to 10 carbon atoms, wherein the activated composition is dispersed on a particulate porous organic substrate comprising a crosslinked copolymerization product of styrene, divinyl benzene and p-acetoxy styrene, wherein a mixture comprising the styrene and the divinyl benzene contains at least about 6 weight percent divinylbenzene wherein p-acetoxy styrene comprises 1 to 30 weight percent of the mixture used to form the copolymerization product.

2. The catalyst composition of claim 1, wherein the mixture comprises 15 to 50 weight percent divinylbenzene with the remainder being styrene.

3. A catalyst composition comprising a metallocene compound contacted with a methylaluminoxane to form an activated composition effective to copolymerize ethylene with an alpha olefin of 3 to 10 carbon atoms, wherein the activated composition is dispersed on a particulate porous organic substrate comprising a crosslinked copolymerization product of styrene, and divinyl benzene which contains pendant functional groups provided by an additional substrate-forming comonomer which is selected from the group consisting of acrylic acid, methacrylic acid, vinyl acetate, methyl vinyl ether, vinyl chloride, chloro styrene, chloro divinyl benzene, vinyl toluene, ethylene glycol diacrylate, ethylene, glycol dimethacrylate, vinyl benzyl chloride, and vinyl pyridine, wherein a mixture comprising the styrene and the divinyl benzene wherein the comonomer comprises 1 to 30 weight percent of the mixture used to form the copolymerization product.

4. The catalyst composition of claim 3, wherein the mixture comprises 15 to 50 weight percent divinyl benzene with the remainder being styrene.

5. The catalyst composition of claim 3, wherein said catalyst composition further contains at least one hydrocarbyl aluminum.

6. The catalyst composition of claim 5, wherein said hydrocarbyl is aliphatic and wherein said hydrocarbyl aluminum comprises about 0.1 to 6 mmol/g of support.

7. The catalyst composition of claim 6, wherein said hydrocarbyl is an aliphatic group of 1 to 6 carbon atoms.

* * * * *